Sept. 5, 1967 T. P. ANDERSON ETAL 3,339,303

FILM STORAGE CARD

Filed Jan. 29, 1965

INVENTOR.

THOMAS P. ANDERSON
THOMAS E. GRAVES

BY Hill, Sherman, Meroni, Gross + Simpson ATTORNEYS 3,339,303

FILM STORAGE CARD

Thomas P. Anderson, Hubbards Woods, and Thomas E. Graves, Arlington Heights, Ill., assignors to Microseal Corporation, Chicago, Ill., a corporation of Illinois Filed Jan. 29, 1965, Ser. No. 429,059
8 Claims. (Cl. 40—159)

The present invention relates to microfilm storage cards and more particularly relates to cards which are adapted to receive a plurality of microfilm strips in side-by-side relation in a record card in such a fashion that the film strips can readily be removed without damage to their supporting card or the microfilm itself.

It has become increasingly apparent to people engaged in the microfilm storage business that a film storage card is required which will permit the operator to mount a film or films within the card so that other films can subsequently be added and so that the already mounted films can be removed and/or replaced by others at will and yet which is designed to permit frequent handling of the card without damage to the mounted films or loss of the films. Such cards must, if possible, also be arranged to be placed within projection equipment to permit the operator to view the projected and enlarged image of the card-mounted microfilm without requiring the removal of the microfilm from the card. Such cards, it has been found, should possess a substantial degree of rigidity so that they may be handled with ease in various types of microfilm handling equipment and yet the storage cards are preferably designed so that copies of the microfilm images can be made by a contact printing process or its equivalent without necessitating the removal of the film strip from the card. Still further, it is of the utmost importance that means be provided to protect the surfaces of the microfilm from mechanical damage such as scratching or tearing and to protect the image-carrying surfaces from atmospheric impurities, handling stains, and the like which might seriously detract from their usefulness when the blown-up image is projected on a screen.

We have devised a record card which possesses each of these advantageous characteristics and which obviates a great many of the disadvantages of prior types of cards.

Our card may, for instance, be employed to mount a plurality of 16 mm. film strips in side-by-side relation and may be embodied in many forms. We have illustrated two forms in which our invention may be embodied and these will hereinafter be described in considerable detail.

Briefly, in one embodiment of the invention a stiff tabulating card is provided which has a rectangular aperture cut therein and which has a pair of transparent, thin films overlying the aperture to provide within the aperture a microfilm-containing space. Film record cards designed in this broad sense are well known in the art and are now used widely in the industry. In this particular embodiment of our invention the thin films overlying the card are bonded together along a straight bonding line which is normal to the access opening to the space between the films. This bonding line serves to divide the aperture into two separate microfilm pockets. Many different means may be employed to bond the films together along the "bonding line" but it is important that the thickness of the bond not exceed the thickness of the microfilm.

By keeping the thickness of the bond to a dimension less than the thickness of the microfilm and by so forming the cards that the films are stretched relatively taut from the bonding line to the edges of the card defining the aperture, the films will have to stretch somewhat to permit a microfilm strip to be inserted within either of the pockets. This stretching of the films serves several important purposes: namely, (1) it insures that the microfilm will be gripped snugly by the enveloping films and thus retained positively within the pocket, (2) it insures that the enveloping films overlying the microfilm will be wrinkle-free and flat over the microfilm area, and (3) it positively insures that separate pieces of microfilm positioned within the same pocket will not override one another.

In the second illustrated embodiment of our invention an entirely transparent card is provided which comprises a stiff flat transparent supporting sheet having a thin resilient transparent film lying within the periphery of the sheet and bonded to the sheet. Straight bonding lines serve to divide the area between the sheet and the film into a multiplicity of side-by-side film pockets which have a width approximating or slightly greater than the width of microfilm to be received therein. These film receiving pockets generally each have one closed end and one open end so that microfilm can be inserted into and removed from the individual pockets as desired.

As already noted, the bond between the thin film and the stiff sheet may be a heat seal bond, an adhesive bond, an ultrasonic bond, a fusion bond, or any other suitable bond whereby the sheet and film can be permanently secured together. In any event, however, it is of the utmost importance that the thickness of the bond or the bonding material (that is the spacing, if any, between the mating surfaces of the film and sheet at the area of the bond) be less than the thickness of the microfilm to be received within the several film pockets, thus insuring that the resilient enveloping film will be stretched taut over the microfilm to insure freedom from wrinkles in the film overlying the image area of the microfilm and insuring a snug grip of the microfilm within the pocket to prevent accidental loss of the microfilm during handling of the storage card.

It is therefore a principal object of the present invention to provide a novel film storage card having means removably gripping a microfilm strip within a transparent film pocket.

Another object of the invention resides in the provision of a novel film record card having means for removably receiving a plurality of microfilm strips in side-by-side relation.

Yet another object of the invention resides in the provision of a film record card wherein means are provided to insure that the enveloping films of the card which overlie the mounted microfilm will be wrinkle-free.

A still further object of the present invention lies in the provision of a record card having means for positively removably gripping a mounted strip of microfilm without necessitating the use of any adhesive or any other means which might in any way damage the microfilm strip.

A still further and more specific object of the invention resides in the provision of a novel film storage card wherein a pair of transparent plastic films are bonded together in face-to-face relation in such a manner that the resiliency of at least one of the films serve to grip a piece of microfilm mounted therebetween and in which the manner of securing the films together insures that the mounted microfilm will be positively held in its mounted position, although the card itself may go through several handling processes.

These and other objects, features, and advantages of the present invention will become apparent from time to time as the following specification proceeds and with reference to the accompanying drawings, wherein.

Figures 1, 2, 3, 4, 5:
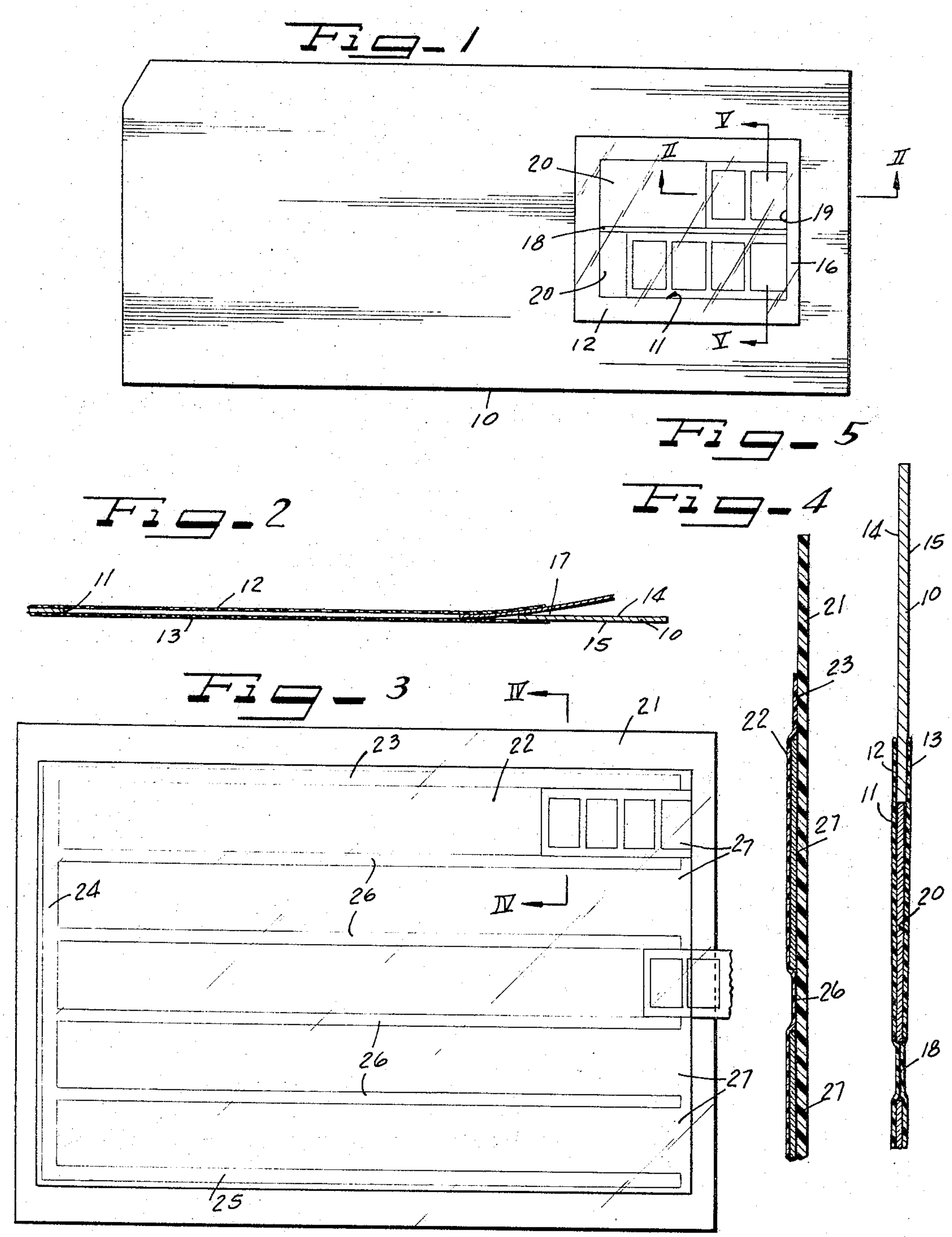
FIGURE 1 is a plan view of a record card constructed in accordance with the principles of the present invention.
FIGURE 2 is a vertical sectional view of a portion of the card shown in FIGURE 1 and taken along lines II—

II of FIGURE 1 and showing a piece of microfilm being inserted within one of the film pockets;

FIGURE 3 is a plan view of another important embodiment of our invention;

FIGURE 4 is a fragmentary sectional view of the card shown in FIGURE 3 and taken along lines IV—IV of FIGURE 3 and showing the relative disposition of the films with and without microfilm strips mounted within the several film pockets; and FIGURE 5 is a fragmentary sectional view through the record card of FIGURE 1 which is taken along lines V—V of FIGURE 1 and which shows the card with microfilm strips mounted within the uppermost film pocket.

In the embodiment of the invention illustrated in FIGURE 1 we have shown a rectangular tabulating card 10 having an aperture 11 formed in the right hand end thereof. The card 10 is adapted to receive punchings, magnetic ink impressions, or other like media-storing impressions thereon and is designed to retain microfilm within the aperture 11 so that the microfilm can be viewed simply by placing the entire card 10 within suitable projection equipment and projecting the image carried by the microfilm without necessitating removal of the microfilm from the aperture.

To this end, the aperture has a pair of very thin, transparent, resilient enveloping members or films 12 and 13 mounted thereover and lying on the front and back surfaces 14 and 15, respectively, of the card 10. The film 13 is stretched rather taut across the aperture 11 and is bonded to the back surface 15 of the card 10 along the entire peripheral edge of the aperture 11 by means of a suitable adhesive or the like. Three edges of the film 12 are bonded to the front surface 14 of the card by similar means and the edge 16 is left unbonded. This edge of the film 12 overlaps the card surface at the right hand edge of the aperture 11 and serves to protect the microfilm within the aperture from atmospheric impurities and yet provides an access opening 17 through which microfilm can be inserted into and removed from the area between the films 12 and 13.

In order to insure that the card mounted microfilm will be protected during storage and to faciliate easy handling of the cards, it is preferable that the thickness of the card stock 10 be equal to or very slightly greater than the thickness of the microfilm.

In the embodiment of the invention illustrated in FIGURE 1, a thin strip of adhesive 18 has been deposited on one of the enveloping films within the aperture area along a line normal to the edge 19 of the aperture 11 adjacent the access opening 16 whereby to divide the area between the enveloping films and within the aperture into a pair of side-by-side film pockets 20. In this case, the film pockets have a width only slightly greater than the 16 mm. width of 16 mm. film. As has already been noted, it is important to understand that the films should be stretched rather taut and evenly over the aperture 11 and that the thickness of the strip of adhesive 18 be somewhat less than the thickness of the film to be inserted into the pockets. In this case, it is important that the adhesive 18 have a thickness less than the normal thickness of 16 mm. film. Under such circumstances, a film inserted through the access opening 17 into the pocket 20 intermediate the films 12 and 13 in the manner shown in FIGURE 2 will stretch the resilient films 12, 13 and the tension of the films will serve to positively grip the microfilm within the pocket and prevent it from accidentally sliding out of the pocket and such stretching of the films will, in addition, insure that there will be no wrinkles in the enveloping films overlying the image area of the microfilm which might interfere with the projected image of the microfilm.

In the embodiment of the invention illustrated in FIGURES 3 and 4 a relatively stiff, heavy, transparent sheet 21 is provided as a support and this sheet has a single resilient thin film 22 mounted thereover which serves the same function as the enveloping films 12, 13 in the first described embodiment of our invention.

In this embodiment of our invention, the supporting sheet or film 21 is a clear transparent plastic material having a thickness on the order of 5 mils, the enveloping film 22 is formed of a clear, transparent plastic stock havin a thickness on the order of 1 mil or one-half a mil and the microfilm contained within the pockets has a thickness on the order of 6 mils. The films 21, 22 are bonded directly to one another or are spaced apart by an adhesive coating a distance which amounts to only a fraction of the thickness of microfilm, such for instance as one-half mil, or less.

It will be observed that the film 22 is entirely contained within the periphery of the sheet 21 and that three edges thereof are positively bonded to the sheet 21 as indicated at 23, 24, 25. As viewed in FIGURE 3, strips of adhesive 26 have been deposited on the sheet 21 along lines parallel to the adhesive bond lines 23, 25 and in equally spaced relation to provide a plurality of microfilm receiving pockets 27. The pockets 27 each have a width slightly greater than the 16 mm. width of 16 mm. film although it will be appreciated that a card could be devised to receive any size film.

All of the bond lines 23, 24, 25 and 26 are formed so that the thickness of the bond (that is the space, if any, between mating surfaces of the film 22 and sheet 21 in the area of the bond) is somewhat less than the thickness of the microfilm to be received within the pockets 27 and the film 22 is, even in its unstressed condition, laid flat over the sheet 21, so that upon insertion of the microfilm into the pockets 27 the microfilm will be gripped by the tension of the stretched enveloping film 22 and the film will be wrinkle-free.

In FIGURE 4 it can easily be seen how the film 22 lies flat in its unstressed condition and how this resilient film is stretched when a strip of microfilm is positioned within the pocket 27. It may also be seen what the relation of the thickness of the film to the thickness of the adhesive bond is.

It will be appreciated that various means can be provided to bond the films of the embodiment of FIGURE 1 or the film and sheet of the embodiment of FIGURE 3 together. These films can be heat sealed together or fused together or secured together in any other suitable fashion so long as the end product is such that at least one of the films must stretch somewhat to accommodate insertion of the microfilm.

It will be understood that these embodiments of our invention have been used for illustrative purposes only and that various modifications and variations in the invention may be effected without departing from the spirit and scope of the novel concepts thereof.

What I claim is:

1. A microfilm record card for removably and grippingly retaining microfilm strips in side-by-side alignment comprising:

a stiff card having a rectangular aperture formed therein;

resilient, transparent enveloping films completely overlying said aperture and lying on opposite surfaces of said card;

means bonding each of said enveloping films to said card about three edges of said aperture whereby to provide an access opening to the area between said films for insertion and removal of microfilm strips;

means bonding facing surfaces of said films together within said aperture along a bonding line running normal to the edge of said aperture at said access opening;

wherein said films are stretched relatively taut across said aperture;

wherein the film-to-film bonding line is of lesser thickness than the microfilm to be contained between said films; and wherein the thickness of said stiff card is only slightly greater than the thickness of the microfilm.

2. A microfilm record card for removably and grippingly retaining microfilm strips in side-by-side alignment comprising:

a stiff card having a rectangular aperture formed therein;

resilient, transparent enveloping films completely overlying said aperture and lying on opposite surfaces of said card;

means bonding each of said enveloping films to said card about three edges of said aperture whereby to provide an access opening to the area between said films of insertion and removal of microfilm strips;

said access opening being provided between one edge of one of said enveloping films and said cards;

means bonding facing surfaces of said films together within said aperture along a bonding line running normal to the edge of said aperture at said access opening;

wherein said films are stretched relatively taut across said aperture;

wherein the film to film bonding line is of lesser thickness than the thickness of the microfilm to be contained between the films;

wherein the thickness of said stiff card is only slightly greater than the thickness of the microfilm; and wherein the said one edge of one of said enveloping members providing said access opening is spaced inwardly from the outer edge of said card whereby to provide a shoulder on the card to facilitate insertion of microfilm between the two films.

3. A microfilm record card for removably and grippingly retaining microfilm strips in side-by-side alignment comprising:

a stiff card having a rectangular aperture formed therein;

resilient transparent enveloping films completely overlying said aperture and lying on opposite surfaces of said card;

a strip of adhesive lying along the opposed surfaces of said card and bonding each of said enveloping films to said card about three edges of said aperture whereby to provide an access opening to the area between said films for insertion and removal of microfilm strips;

a strip of adhesive lying intermediate facing surfaces of said films and bonding said films together within said aperture along a bonding line running normal to the edge of said aperture at said access opening; wherein said films are stretched taut across said aperture;

wherein the adhesive strip bonding said films together within said aperture is of lesser thickness than the thickness of the microfilm to be contained between the films; and wherein the thickness of said stiff card is only slightly greater than the thickness of the microfilm.

4. A microfilm record card constructed in accordance with claim 2 wherein said means bonding facing surfaces of said films together within said aperture comprises a heat seal bond.

5. A microfilm record card for removably and grippingly retaining microfilm strips in side-by-side alignment comprising:

a pair of mating transparent members disposed in juxtaposed relation to one another;

said members being bonded together along a plurality of straight, parallel bonding lines spaced apart a distance only slightly greater than the width of tthe microfilm to be contained therebetween whereby to define a plurality of film-receiving pockets;

said members lying taut and flat across the width of said pockets and in surface contact with one another when no microfilm is positioned within said pockets;

at least one of said members being formed of stretchable material whereby said one of said members will stretch to accommodate the insertion of microfilm within a pocket and thereby grip the microfilm to maintain it slightly between and in contact with said members across both surfaces of said microfilm.

6. A microfilm record card constructed in accordance with claim 5 wherein one of said members is relatively thicker and more rigid than the other to provide support for the record card.

7. A microfilm record card constructed in accordance with claim 5 wherein said bonding lines comprise fused portions of said members themselves.

8. A microfilm record card for removably and grippingly retaining microfilm strips in side-by-side alignment comprising:

a pair of transparent films lying in face-to-face relation and providing a microfilm carrying space therebetween;

means bonding facing surfaces of said films together along a straight bonding line whereby to form separate film pockets on opposite sides of said bonding line; means sealing said films together along lines spaced outwardly from said bonding line to provide straight side edged film pockets having a width only slightly greater than the width of the microfilm to be contained therein;

wherein said means sealing said films together along lines spaced outwardly from said bonding line comprise a piece of relatively stiff card stock and means bonding said films to opposite sides of said card stock;

means providing an access opening to said pockets normal to said straight bonding line;

wherein said films are stretched relatively taut across said pockets by means including the relative thickness of said bonding line and said microfilm; and wherein the film-to-film bondng line is of lesser thickness than the thickness of the microfilm which said pockets are adapted to receive.

References Cited

UNITED STATES PATENTS

| | | | |
|---|---|---|---|
| 2,687,590 | 8/1954 | Johnson | 40—159 |
| 2,843,955 | 7/1958 | Engelstein | 40—158 |
| 2,861,369 | 11/1958 | Widmaier | 40—159 |
| 3,245,166 | 4/1966 | Hagner | 40—159 |

FOREIGN PATENTS

| | | |
|---|---|---|
| 1,059,252 | 11/1963 | France. |

EUGENE R. CAPOZIO, *Primary Examiner.*

W. J. CONTRERAS, *Assistant Examiner.*